Feb. 4, 1969  N. E. DAVIS  3,425,192
VACUUM CLEANING SYSTEM
Filed Dec. 12, 1966
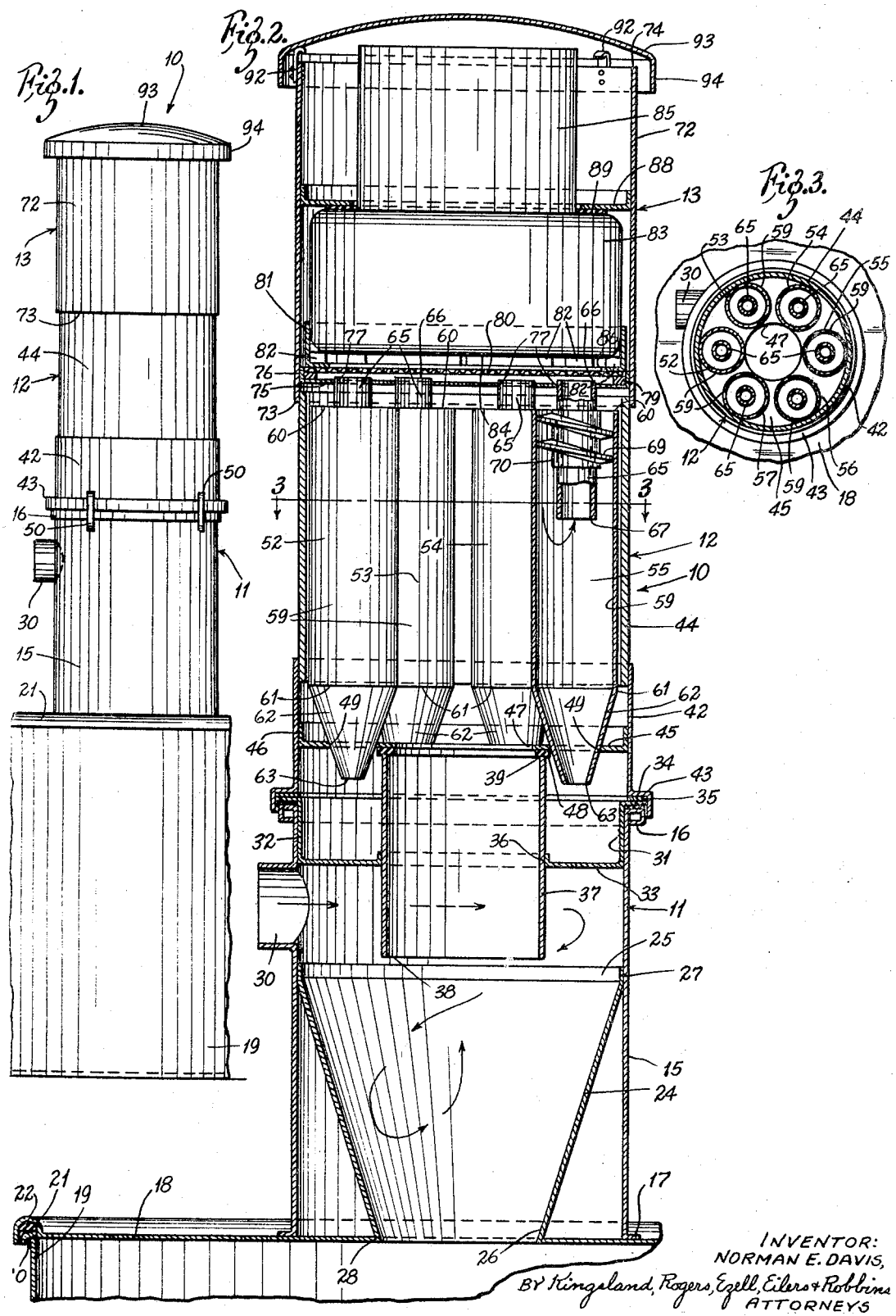
INVENTOR:
NORMAN E. DAVIS,
BY Kingsland, Rogers, Ezell, Eilers & Robbins
ATTORNEYS

United States Patent Office 3,425,192
Patented Feb. 4, 1969

3,425,192
VACUUM CLEANING SYSTEM
Norman E. Davis, Dallas, Tex., assignor to John E. Mitchell Company, Dallas, Tex., a corporation of Missouri
Filed Dec. 12, 1966, Ser. No. 600,821
U.S. Cl. 55—345                2 Claims
Int. Cl. B01d 45/12

ABSTRACT OF THE DISCLOSURE

A cleaning tank system to be used with a vacuum hose, having a cylindrical housing that can be considered in three superposed sections. In the bottom section is a centrifugal separator for separating maximum size dirt. It discharges air into a second section containing a plurality of smaller cyclone separators from which other dirt is extracted and separately collected in a pan above and apart from the collector for the first stage. The multiple separators of the second stage then discharge toward the third section of the housing which contains the suction fan preceded by a filter to completely clean the air which finally discharges from the top section.

Brief description of the invention

This invention relates to a vacuum cleaning system. The invention is particularly directed to a vacuum cleaning system having first and second cleaning stages through which air serially flows, the first stage cleaning section comprising a first stage cyclone separator for separating the heavy dirt and foreign matter particles from the air, and the second stage cleaning section comprising a plurality of smaller second stage cyclone separators for separating the remaining finer dirt and foreign matter particles from the air prior to discharge of the air from the vacuum cleaning system.

In general, this vacuum cleaning system comprises vertically arranged lower, middle, and upper housing sections. Air enters the lower housing section tangentially and is caused to swirl above the open upper end of an inverted frusto-conical member as the heavier dirt and foreign matter falls downwardly into a relatively large dirt receptacle. Thereafter, the dirt flows upwardly through a central cylindrical sleeve to the upper ends of a plurality of second stage cyclone separators. In the second stage cyclone separator, a plurality of helical vanes cause the dirt to swirl in a downward helical direction within tubular members, as the finer dirt and foreign matter particles fall downwardly into another dirt collecting pan. Thence, the dirt is sucked upwardly through central tubes through a final filter sheet and through the vacuum pump to be discharged from the vacuum cleaning system.

Objects of the invention are to provide apparatus as generally outlined above, and particularly to provide a vacuum cleaning system having first and second stage cyclone separators for separating heavier and then lighter dirt particles from the air as it passes through the system. Other objects are apparent from the description and particularly from the claims.

In the drawing:

FIGURE 1 is a fragmentary side elevation view of the vacuum cleaning system;

FIGURE 2 is a fragmentary enlarged view in longitudinal medial section through the vacuum cleaning system; and FIGURE 3 is a view in section on a reduced scale taken along the line 3–3 of FIGURE 2.

This vacuum cleaning system 10 has a housing that can be considered in three principal sections which enclose a first stage cyclone separator 11, a second stage cyclone separator 12, and a pump 13, respectively. The first stage cyclone separator 11 comprises a cylindrical housing section 15 having a rolled upper edge 16 and a flanged lower edge 17. The flanged lower edge 17 is welded to a horizontal cover plate 18 that rests upon a dirt receptacle 19. The upper edge 20 of the dirt receptacle 19 is rolled, and the outer edge 21 of the cover 18 has a complementary roll with a gasket 22 fitted within it. The gasket 22 rests upon the rolled edge 20 of the receptacle 19 when the cover 18 is in place to provide an airtight seal.

A inverted downwardly tapering frustro-conical member 24 is positioned within the lower housing section 11. The inverted frustro-conical member 24 has a relatively large open upper end 25 and a smaller open lower end 26. The upper peripheral edge 27 of the inverted frustro-conical member 24 is welded to the cylinder 15. The lower end 26 of the inverted frusto-conical member 24 extends through an opening 28 in the cover 18, and the edge of the cover 18 which defines the opening 28 is welded to the lower end 26 of the member 24.

An inlet pipe 30 opens tangentially into the side of the lower housing section 11. The inlet fitting is adapted to be connected to a suction hose leading from a cleaning tool, or the like (not shown). The inlet fitting 30 is located just above the upper end 25 of the inverted frusto-conical member 24 to introduce air and foreign matter carried by the air tangentially, causing the air to swirl above the inverted frusto-conical member 24.

A cup-shaped partition 31 having a vertical cylindrical side plate 32 and a horizontal baffle plate 33 is removably supported within the upper end of the cylinder 15. There is an outwardly extending annular flange 34 depending from the cylindrical wall 32 with an annular gasket 35 clamped about the flange 34 and adapted to rest upon the rolled upper edge 16 of the cylinder 15. The baffle plate 33 has a flanged opening 36 through its center. A cylindrical sleeve 37 extends through and is welded to the flanged opening 36. The lower end 38 of the sleeve 37 is positioned immediately above the upper end 25 of the inverted frusto-conical member 24. The upper end 39 of the sleeve 37 extends above the flanged perimeter of the cup member 31. The area between the sleeve 37 and the cylinder 15 below the baffle plate 33 defines an inverted annular channel within which the incoming air swirls before it enters the lower end of the sleeve 37.

The middle housing section 12 comprises a metal cylindrical wall 42 having a radially outwardly and downwardly flanged annular shoulder 43 at its lower end adapted to fit upon the annular gasket seal 35. Another cylindrical wall 44 is fitted within and welded to the cylindrical wall 42.

A baffle wall 45 has an annular flange 46 welded to the inner wall of the cylinder 42 intermediate the upper and lower ends of the cylinder 42. The baffle wall 45 has a large central opening 47 that is slightly smaller in diameter than the diameter of the sleeve 37. A gasket 48 surrounding the opening 47 is glued to the lower surface of the baffle wall 45 and rests upon the upper edge of the sleeve 37. The baffle wall 45 also has a plurality of regularly spaced openings 49 through it.

Several manually releasable clamps 50, of conventional design, are supported by the cylinder 15 to lock the cylinders 44 and 15 together. When the clamps 50 are released, the cylinder 44 can be lifted free of the cylinder 15.

There are a plurality of second stage cyclone separators 52, 53, 54, 55, 56, and 57 mounted within the middle housing section 12. Each second stage cyclone separator has a cylindrical tubular body 59 with an open upper end 60 and a lower end 61 that is joined to a tapering inverted frusto-conical wall 62 having an open lower end 63. The inverted frusto-conical wall 62 extends through one of the openings 49 in the baffle wall 45 and may be welded in place, thereby positioning the open lower end 63 above the dirt collecting pan 31.

Each second stage cycone separator 52–57 also includes a smaller diameter tube 65 having an open upper end 66 positioned above the upper end 60 of the tubular wall 59 and having an open lower end 67. A molded plastic helical van 69 is molded with a body 70 that is press-fitted onto the tube 65. The outer edges of the helical vane 69 are in close proximity to or contact with the inner wall of the tubular body 59. The tubes 65 are supported from the upper housing section 13 as will be described.

The upper housing section 13 comprises a cylindrical wall 72, the lower end 73 of which is welded to the upper end of the cylindrical wall 44. The upper end 74 of the cylindrical wall 72 is also open. There is a baffle wall 75 having a peripheral flange 76 wedged to the inner surface of the cylindrical wall 72. The baffle wall 75 has a plurality of openings 77 through it. The small diameter tubes 65 extend through the openings 77 and are welded therein, thereby suspending the tubes 66 below the wall 75 and into the second stage cyclone separator tubes 59.

A peripheral ring 79 rests upon the baffle wall 75 and supports a fibrous filter plate 80. A pump support plate rests upon the fibrous filter 80. An annular flange 81 extends upwardly from the plate 80, and a plurality of lugs 82 extend inwardly from the flange 81 to support a vacuum pump 83. The vacuum pump 83 is of conventional design of the kind having a suction inlet at its lower end 84 and having an upper section 85 with a plurality of discharge outlets. The pump support plate has an opening 86 through its center for admitting air to the inlet to the vacuum pump 83.

A baffle wall 88 is mounted in the upper housing section and presses an annular gasket 89 against the housing of the vacuum pump 83 just below the upper discharge section 85.

A plurality of upwardly extending metal brackets 92 are riveted or bolted to the cylinder 72. The brackets 92 support a cover 93 in spaced relation relative to the upper edge of the cylinder 72. The cover 93 has a downwardly extending annular skirt 94 that is spaced radially beyond the cylinder 72 to provide weather protection, while permitting passage of air discharged from the vacuum pump 83 to the external atmosphere.

*Operation*

In operation, air carrying dirt and other foreign matter enters the inlet 30 through the usual hose attached to a conventional suction tool (not shown). The air and the dirt and foreign matter carried by the air enter the cylinder 15 in a tangential direction and are caused to swirl about the area below the baffle plate 33 and between the sleeve 37 and the cylinder 15. As the air swirls in the thus defined channel, the heavier dirt and foreign patricles fall into the open upper end 25 of the inverted frusto-conical member 24 and are discharged into the receptacle 19. The pump 83 continues to create suction on the swirling air, and causes the air to flow upwardly through the sleeve 37 to the upper ends 60 of the second stage cyclones separators 52–57. The air now carries only finer particles, the heavier dirt and foreign matter particles having been separated by the first stage cyclone separator in the lower housing section 11.

As the dirt enters the second stage cyclone separators, it is caused to swirl by the helical vanes 69, the tubes 65 forcing the air to travel downwardly into the tubular members 59. As the dirt swirls about the space between the tubes 65 and the tubular members 59, the small particles of dirt and foreign matter fall downwardly through the tubes 59 and the lower frusto-conical section 62, and are discharged into the collection pan 31. This separation of smaller dirt and foreign matter particles from the air continues simultaneously in all the second stage cyclone separators 52–57 since the suction in these second stage cyclone separators is substantially uniform. The baffle wall 45, the pan 33 and associated walls constitute means to prevent or to block communication between the outlets of the separators 59 and the suction side of the fan.

After the air has swirled about in the tubular members 59, it is sucked upwardly through the tubes 65, flows through the final filter elements 80, and through the vacuum pump 83, to be discharged through the open upper end 74 of the cylinder 72 past the cover 93. The second stage cyclone separators 52–57 are so effective in separating the small dirt and foreign particles from the air that the filter 80 rarely needs cleaning or replacing.

The vacuum cleaning system 10 is very easy to clean. Manual releasing of the clamps 50 permits the middle and upper housing sections 12 and 13 to be lifted away from the lower housing section 11. This can be followed by removal of the collecting pan 31 and the sleeve 37 which is welded to it, to dump the collected dirt and foreign matter. Thereafter, the collecting pan 31, with the sleeve 37, is replaced, and the middle and upper housing sections 12 and 13 are replaced and clamped to the lower housing section 11. The gasket 35 provides an airtight seal when the clamps 50 are locked.

Lifting the lower, middle an upper housing sections 11, 12, and 13 together from the receptacle 19 permits cleaning of the receptacle 19. Since the receptacle 19 is quite large, it need be cleaned only rarely.

Thus, this vacuum cleaning system 10 provides complete and thorough separation of dirt and foreign matter from the air and can, itself, be quickly and easily cleaned without the replacement of parts. Furthermore, the passage of air through the vacuum cleaning system 10 is not inhibited by the usual paper or other micro-porous filter elements. As a result, the operation of the vacuum pump 83 is more effective in creating greater suction power.

Various changes and modifications may be made within the purview of this invention as will be readily apparent to those skilled in the art. Such changes and modifications are within the scope and teaching of this invention as defined by the claims appended hereto.

What is claimed is:

1. A vacuum cleaning system comprising a vertical housing, having first, second and third housing sections, in sequence one above the other, a tangential inlet to the first housing section, an outlet from the third housing section, means within the first housing section defining a first stage cyclone separator comprising an annular channel having an open bottom and closed top and inner and outer concentric side walls, the inner concentric side wall opening through to the second housing section, the annular chanel communicating with the inlet to receive incoming air laden with foreign matter and cause the air and foreign matter to swirl, an inverted frusto-conical member below the inner concentric wall and within the annular channel and having a large open end at its top connected to the outer concentric wall for reciving foreign matter falling from the air swirling within the annular channel and having a smaller open bottom end for discharging the foreign matter, a plurality of second stage cyclone separators supported within the second housing section above the annular channel, each second stage cyclone separator comprising a tube having an open upper end and an open lower end, the upper ends of the tubes of the second stage cyclone separators being in communication with the first housing section through the inner concentric wall of the annular channel, means spaced from the lower ends of the second stage cyclone separators blocking communication between the lower ends of the second stage cyclone separators and the first stage cyclone separator of the first housing section and providing a dirt collector pan, extending above the tangential inlet and between the inner and outer concentric walls, an outlet tube extending into each second stage cyclone separator through the upper end thereof and spaced from the wall of the tube, each outlet tube having an open upper end positioned above the upper end of the second stage cyclone separator and an open lower end positioned below the upper end of the second stage cyclone separator tubes, the outlet tubes being smaller in diameter than the internal diameters of the tubes of the second stage cyclone separators, means to cause air and foreign matter passing through the space between the tubes of each of the second stage cyclone separators to swirl while the foreign matter separates from the air and falls toward the lower ends of the second stage cyclone separators, a means providing source of subatmospheric pressure within the third housing section having an air inlet and an air outlet, the upper ends of the outlet tubes communicating with the air inlet to the means providing a source of subamospheric pressure, means providing flow communication between the outlet tubes and the means providing a source of subatmaspheric pressure while blocking communication between the inlet to the means providing a source of subatmospheric pressure and the first and second stage cyclone separators other than the upper ends of the outlet tubes, and means establishing communication between the air outlet of the source of subatmospheric pressure and the outlet from the housing and means for removing dirt from the dirt collector.

2. The vacuum cleaning system of claim 1 wherein the first and second housing sections are separable sections, the second section supporting the second stage cyclone separators and the third section supporting the means providing a source of subatmospheric pressure, the first housing section supporting the inverted frusto-conical member, said dirt collecting pan supported by the first section below the second stage cyclone separators when the first and second housing sections are joined together, the dirt collecting pan being annular with an open upper end which is exposed when the second hosuing section is removed from the first housing section, the first housing section comprising a dirt receptacle positioned below the inverted frusto-conical member.

References Cited

UNITED STATES PATENTS

| | | | |
|---|---|---|---|
| 1,940,196 | 12/1933 | Wagner | 55—349 X |
| 2,295,984 | 9/1942 | Wilson | 55—472 X |
| 2,372,514 | 3/1945 | Pootjes | 55—343 X |
| 2,551,890 | 5/1951 | Love | 55—343 X |
| 2,553,175 | 5/1951 | Davenport et al. | 55—348 X |
| 2,887,177 | 5/1959 | Muhd et al. | 55—348 X |
| 3,061,994 | 11/1962 | Mylting | 55—346 |

HARRY B. THORNTON, *Primary Examiner.*

B. NOZICK, *Assistant Examiner.*

U.S. Cl. X.R.

55—459, 457; 209—144; 55—472; 210—512